United States Patent [19]

Swallow

[11] 4,137,763
[45] Feb. 6, 1979

[54] HOSIERY TESTING APPARATUS

[75] Inventor: Roger T. Swallow, Asheboro, N.C.

[73] Assignee: Rampon Products, Incorporated, Asheboro, N.C.

[21] Appl. No.: 917,544

[22] Filed: Jun. 21, 1978

[51] Int. Cl.$^2$ ............................................... G01L 5/04
[52] U.S. Cl. ....................................... 73/159; 223/75; 223/77
[58] Field of Search ................. 73/95, 97, 159; 26/70; 33/2 A; 223/61, 74, 75, 77

[56] References Cited

U.S. PATENT DOCUMENTS

| | | | |
|---|---|---|---|
| 2,369,661 | 2/1945 | Dangelimajer | 73/159 |
| 2,567,478 | 9/1951 | Hartline | 33/2 A X |
| 2,661,877 | 12/1953 | Albertson et al. | 33/2 A |
| 2,675,703 | 4/1954 | Henimerich et al. | 73/159 |
| 3,811,607 | 5/1974 | Glaze, Jr. | 223/74 |
| 3,818,756 | 6/1974 | Barron et al. | 73/159 X |
| 3,975,956 | 8/1976 | Peel | 73/159 |

*Primary Examiner*—Charles Gorenstein
*Attorney, Agent, or Firm*—Bell, Seltzer, Park & Gibson

[57] ABSTRACT

A hosiery article stretching and marking device and a leg form are provided to accurately measure and compare the relative compressive forces of longitudinally spaced portions of stretchable hosiery articles. The form includes integral leg and foot portions with the leg portion being circular in cross-section throughout its length and with successive segments increasing in circular diameter from the foot portion and throughout the length of the leg portion. Flat flexible and radii conformable sensor devices are supported in spaced longitudinal positions along the leg form and pressure indicating gauges are operatively connected to the sensor devices and provide a visual indication of the relative compressive forces applied by the hosiery article on the areas of the leg form where the sensor devices are located. The stretching and marking device is used for premarking the hosiery with longitudinal lines which are used to properly align the hosiery with positioning indicia lines extending longitudinally along the leg portion of the form.

10 Claims, 10 Drawing Figures

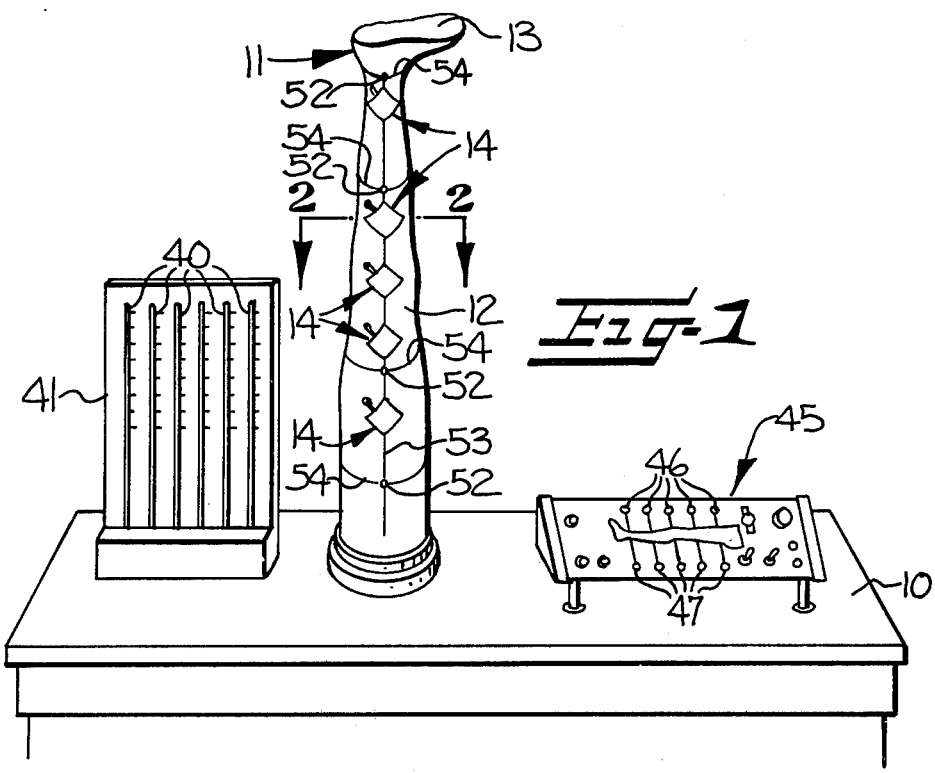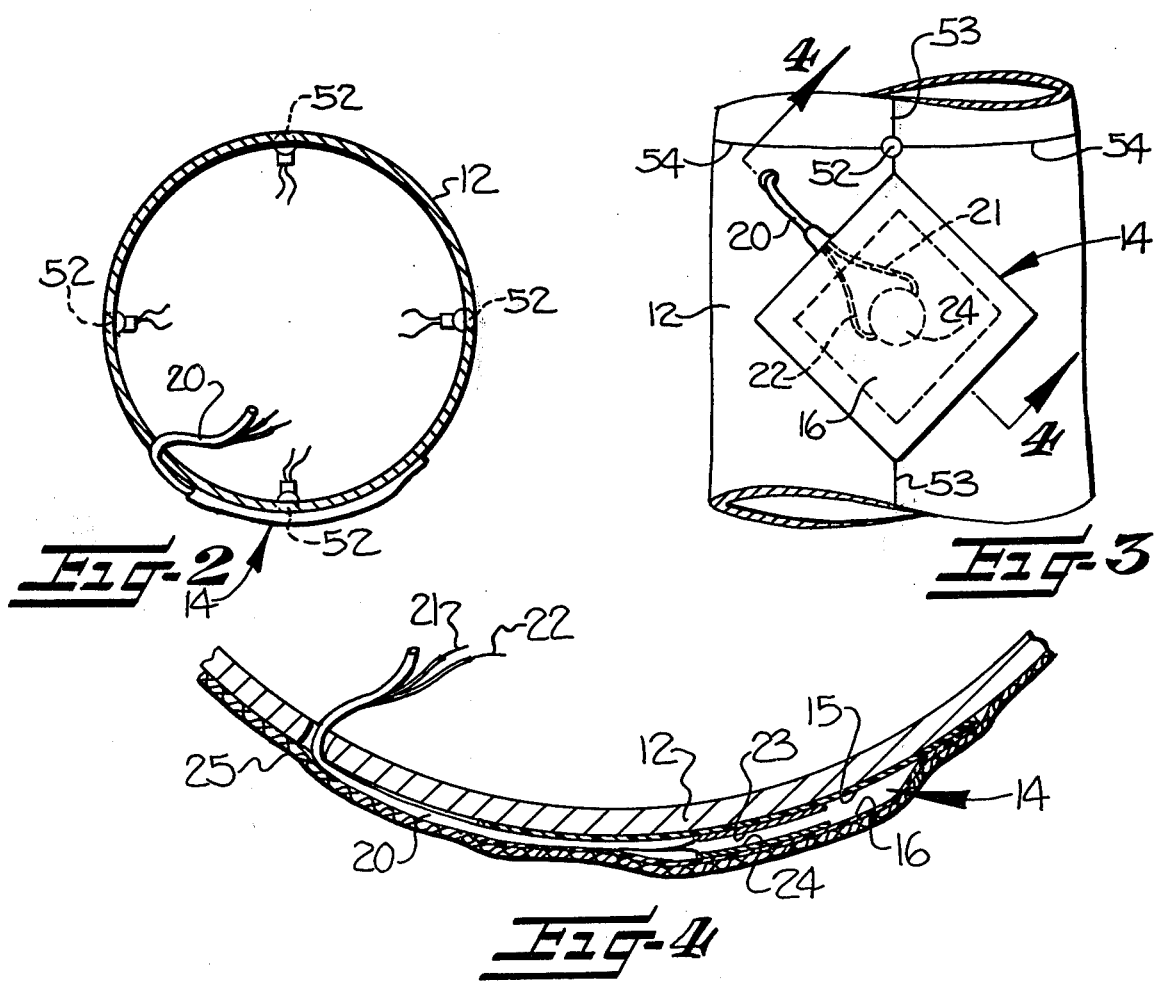

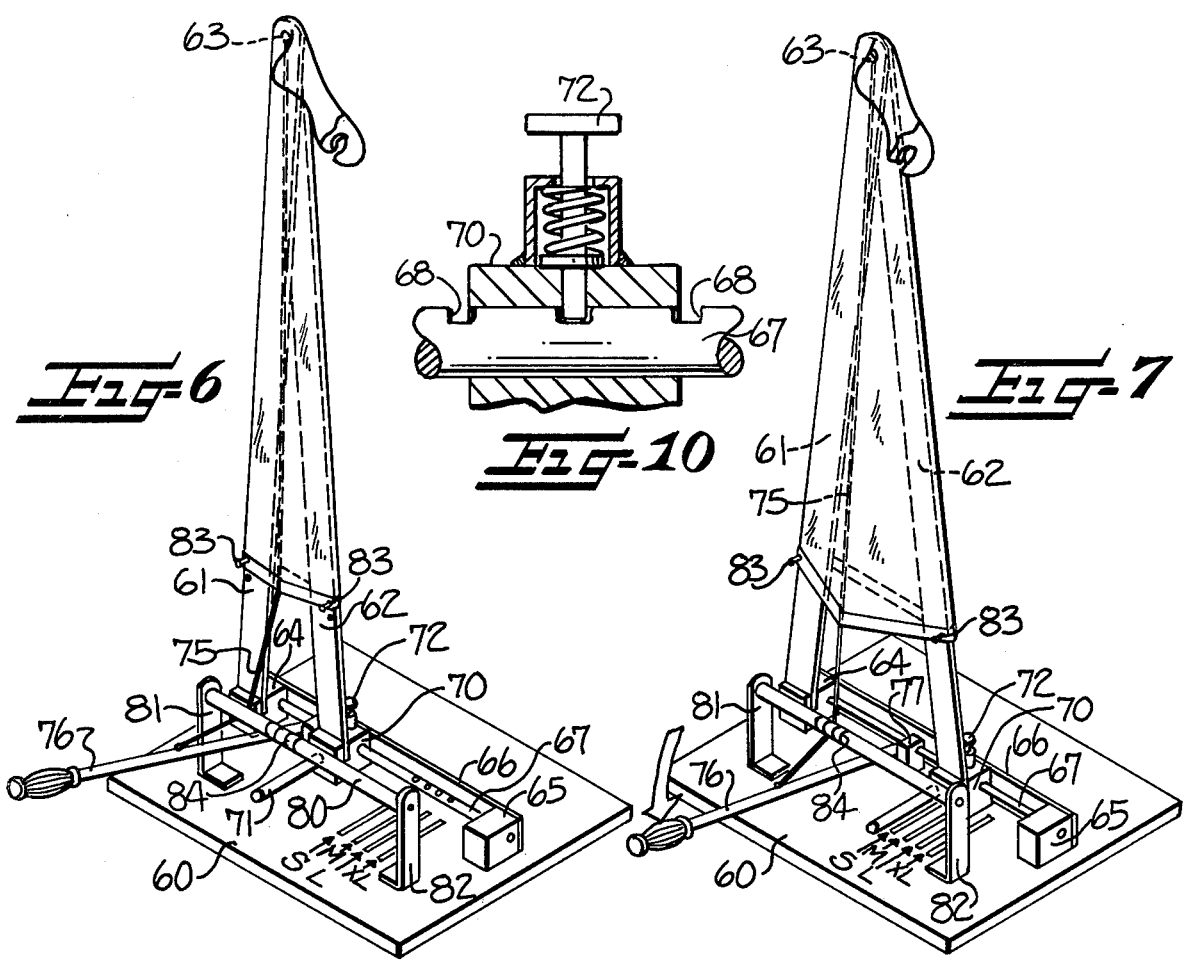

HOSIERY TESTING APPARATUS

This invention relates generally to an apparatus for accurately measuring and comparing the relative compressive forces of longitudinally spaced-apart portions of stretchable hosiery and more particularly to such an apparatus which includes a form adapted to support stretchable hosiery articles in stretched condition thereon, and a stretching and marking device for premarking the hosiery with longitudinal lines which are used to properly align the hosiery on the form for testing. The leg portion of the form is circular in cross-section throughout its length with successive segments along the length of the leg portion increasing in circular diameter from the foot portion and throughout the length of the leg so that the hosiery article, when properly positioned on the form, is uniformly stretched around the circumference of the leg form thereby permitting accurate measurements of the compressive forces applied to the leg form.

Hosiery testing devices which employ pressure sensors spaced along a form simulating the shape of the human leg have been used for some time, for example, such leg forms are illustrated in U.S. Pat. Nos. 2,675,703 and 3,503,257. Since this type of leg form substantially conforms to the shape of the human leg, cross-sectional areas through spaced longitudinal positions along such leg forms are not cylindrical but are of different elliptical or oval forms. In such non-cylindrical cross-sectional areas the radius of the leg form and/or sensor is not constant and the compressive forces of the hosiery article around the form will vary in accordance with the radius of the corresponding area of the form and the radius of each sensor. Under these circumstances, the compressive force measurements around the form will vary, depending upon the radius of the particular area where the pressure sensor is located. Also, the pressure readings obtained depend, to a large degree, upon the manner in which the hosiery article is positioned on the form.

With the foregoing in mind, it is an object of the present invention to provide a hosiery article testing apparatus including a leg form that is circular in cross-section throughout its length with flat flexible sensors that assume the radius of the circular cross-section of the leg form without distorting its curvature and girth and a stretching and marking device for premaking the hosiery with longitudinal lines. The lines on the hosiery are used to properly align the hosiery with positioning indicia lines extending longitudinally along the leg portion of the form so that accurate measurements of the relative compressive forces of a stretchable hosiery article against the form may be obtained.

The apparatus of the present invention includes flat flexible electro-pneumatic sensor devices supported on and in spaced positions longitudinally of the leg portion of the form. The electro-pneumatic sensor devices each includes an expandable chamber and a pair of electrical contacts within the chamber. The electrical contacts are normally in a closed position and are movable to an open position when the expandable chamber is expanded. A source of fluid pressure is operatively connected to the electro-pneumatic sensor devices and the electrical contacts of the electro-pneumatic sensor devices control the flow of fluid pressure thereto. A control unit is provided with signal lights for indicating when a sufficient amount of fluid pressure has entered the electro-pneumatic sensor devices to move the electrical contacts to an open position.

Manometer type liquid level pressure indicating gauges are operatively connected to the fluid pressure source and to the corresponding electro-pneumatic sensors for indicating the amount of pressure applied to the corresponding expandable chambers to move the electrical contacts to the open position and for indicating the amount of compressive force applied by the hosiery article at spaced locations along the form. Since the flexible electro-pneumatic sensor devices are spaced longitudinally along the leg portion of the form, the corresponding liquid level pressure indicating gauges provide a visual indication of the compressive forces in the various parts of the hosiery article when positioned on the form in stretched condition. Hosiery positioning indicia lines extend longitudinally along each quadrant of the leg form and indicator lights are aligned along the quadrant indicia lines on the leg portion of the form for aiding in aligning the hosiery article in the proper quadrant position on the leg form for testing. The indicator lights are particularly useful when testing heavyweight or opaque hosiery articles, such as men's knee-high stockings and the like.

The hosiery stretching and marking device includes a pair of longitudinal stretching members provided with narrow hosiery engaging edge portions. The stretching members are initially positioned close together to receive the hosiery article in unstretched condition thereon. The stretching members are then moved apart to uniformly stretch opposite halves of the hosiery article therebetween and longitudinal chalk lines are formed down the narrow edge portions to indicate uniformly stretched halves of the hosiery article. A stretching wire is initially positioned in alignment between the stretching members and is moved to a position midway between and outwardly to equally divide and uniformly stretch the half of the hosiery article so that a chalk line can be formed along the wire and divide the stretched half of the hosiery article into equal quadrants. The longitudinal quadrant lines on the hosiery article are then used to indicate when the hosiery article is properly positioned on the leg form.

Other objects and advantages of the invention will appear as the description proceeds when taken in connection with the accompanying drawings, in which FIG. 1 is a perspective front view of the presenting testing apparatus and illustrating the arrangement of the components thereof;

FIG. 2 is an enlarged horizontal sectional view through the leg form and being taken substantially along the line 2—2 in FIG. 1;

FIG. 3 is an enlarged elevational view of a fragmentary portion of the leg form and illustrating one of the flat flexible electro-pneumatic sensor devices supported on the surface of the leg form;

FIG. 4 is an enlarged sectional view through the flat flexible electro-pneumatic sensor device, being taken substantially along the line 4—4 in FIG. 3;

FIG. 6 is an isometric view of the stretching and marking device with the longitudinal stretching members in closely spaced-apart position with a hosiery article in unstretched condition thereon;

FIG. 7 is a view similar to FIG. 6 but showing the stretching members expanded to laterally stretch the hosiery article and with the stretching wire equally dividing and uniformly stretching one-half of the hosiery article;

FIG. 8 is a plan view of the stretching and marking device shown in FIG. 6 with the hosiery article removed therefrom;

Figure 5:
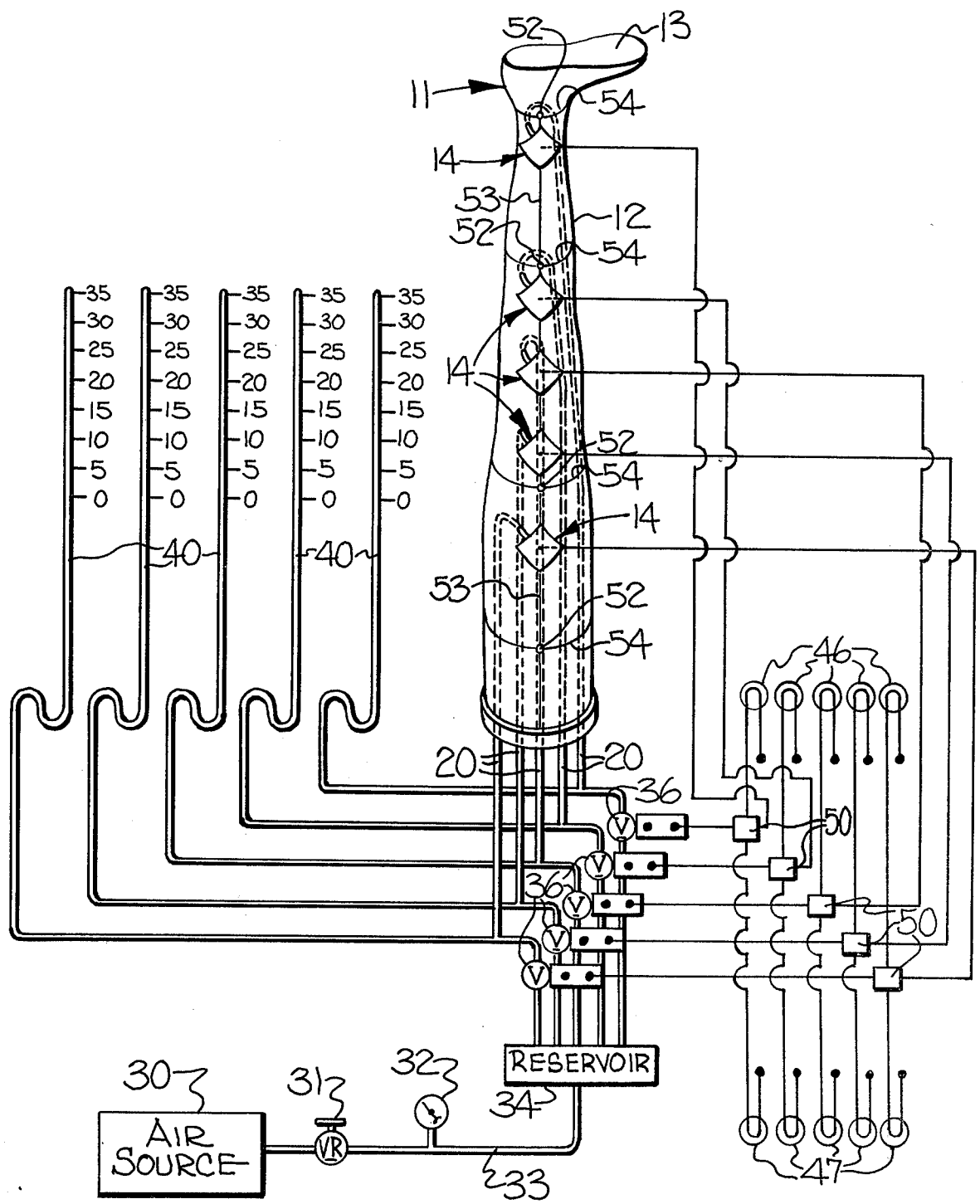
FIG. 5 is a somewhat schematic flow diagram illustrating the interconnection of the electro-pneumatic sensor devices with the corresponding signal lights and the manometer type liquid level pressure indicating gauges.

FIG. 9 is a plan view of the stretching and marking device shown in FIG. 7 and illustrating the manner in which the stretching wire uniformly stretches and provides a quadrant division of one-half of the hosiery article; and FIG. 10 is a greatly enlarged sectional view taken substantially along the line 10—10 in FIG. 9 and illustrating the manner in which the movable stretching member is maintained in the proper position when the hosiery article is stretched.

Referring particularly to FIG. 1, the apparatus includes a support table 10 for supporting the various components of the testing apparatus, including a leg form, broadly indicated at 11, having integral leg and foot portions 12, 13. As best illustrated in FIG. 2, the leg portion 12 is circular in cross-section throughout its length so that the radius of each area of the circumference of the form and flexible electro-pneumatic sensor is constant at each particular spaced portion along the form. Successive segments along the length of the leg portion 12 increase in circular diameter from the foot portion 10 and throughout the length of the leg portion 12. The form 11 is adapted to support various types of stretchable hosiery articles in stretched condition thereon, for a specific sized population group utilizing knee-high, thigh-length, panty hose, or the like stockings. Leg forms of varying sizes are used to test other stocking sizes, earmarked for different population groups.

Electro-pneumatic sensor devices, broadly indicated at 14, are supported on and in spaced positons longitudinally of the leg portion 12. As best illustrated in FIGS. 3 and 4, each of the flexible electro-pneumatic sensor devices 14 is formed of a square inner fluid impervious sheet 15 and an outer square fluid imprevious sheet 16. The outer edges of the sheets 15, 16 are suitably sealed together to provide an expandable chamber therebetween. Various types of flexible fluid impervious sheet material may be used and it is preferred that these sheets be plastic film of from about 2 to 5 mils thick with the inner surface of the inner sheet 15 being suitably supported on the leg form 11, as by glue. One end of a fluid pressure supply tube 20 is suitably attached to the electro-pneumatic sensor device 14 and in communication with the expandable chamber and the tube 20 passes through an opening and to the interior of the leg portion 12. Electric wires 21, 22 pass through the supply tube 20 and into the expandable chamber where their ends are suitably connected to inner and outer electrical contacts 23, 24. As illustrated in FIGS. 3 and 4, the electrical contacts 23, 24 are in the form of thin circular discs suitably secured to the inner surfaces of the respective inner and outer sheets 15, 16 which can be square or circular.

When a stretchable hosiery article, such as is illustrated at 25 in FIG. 4, is placed on the form 11 in stretched condition, compressive force is applied inwardly against the form so that the electrical contacts 23, 24 of the electro-pneumatic sensor device 14 are in the closed position. The contacts 23, 24 will remain in contact with each other until fluid pressure is applied through the tube 20. The contact 24 will then be moved outwardly, as illustrated in FIG. 4, so that the contacts 23, 24 are then in the open position.

Fluid pressure means is operatively connected to the flexible electro-pneumatic sensor devices 14 for at times expanding the expandable chambers therein and includes a suitable source of compressed air, indicated at 30 in FIG. 5. A regulator valve 31 and pressure gauge 32 are provided in a supply line 33 which is connected to the air supply 30 and a reservoir manifold 34 for distribution of the air pressure to the electro-pneumatic sensor devices 14.

Electrically operated solenoid valves 36 are positioned in each of the air pressure supply lines 20 to control the flow of air pressure to the electro-pneumatic sensor devices 14. The electro-pneumatic sensor devices 14 are operatively connected to corresponding manometer type liquid level pressure indicating gauges, in the form of liquid level tubes 40, which are supported in a vertical position on a support board 41 (FIG. 1) and pressure indicating indicia is provided adjacent each of the liquid level tubes 40. The supply lines 20 also connected the liquid level tubes 40 to the valves 36.

A control unit, broadly indicated at 45 in FIG. 1, is supported on the table 10 and includes signal lights operatively connected to each of the electro-pneumatic sensor devices 14 for indicating the closed and open positions of the electric contacts 23, 24. The signal lights include a first set of lights 46, which may be red, and a second set of signal lights 47, which may be green. The first and second sets of signal lights 46, 47 are operatively connected to the respective electro-pneumatic sensor devices 14 and the solenoid valves 36 through suitable relays 50, as schematically illustrated in FIG. 5.

As illustrated in FIG. 1, the first set of lights 46 and the second set of lights 47 are positioned along and adjacent opposite sides of an outline of the hosiery form 11 to generally indicate the longitudinal locations of the corresponding electro-pneumatic sensors 14 spaced along the leg form 11. While the longitudinal positioning of the electro-pneumatic sensor devices may be varied as desired, it is preferred that they be positioned to measure the compressive forces in the hosiery article at the ankle, the calf, the knee, the mid-thigh and the upper thigh.

To aid in aligning the hosiery article on the hosiery form 11 in the proper position, indicator lights 52 are aligned along the leg portion 12 in spaced-apart positions and preferably along quadrant lines 53 extending longitudinally of and dividing the form into equal quadrants. The leg portion 12 of the form is provided with circumferential elevation lines 54 extending around the form and corresponding with the positions of the indicator lights 52. The lights 52, longitudinal lines 53, and horizontal or circumferential lines 54 are used to align the hosiery article in the proper position on the form 11.

The hosiery article is placed on the stretching and marking device shown in FIGS. 6–10 and premarked with chalk lines to insure that successive hosiery articles are placed on the hosiery form in the proper uniformly stretched condition to obtain accurate comparative compressive force measurements.

The hosiery article stretching and marking device is mounted on a platform 60 and includes a pair of longitudinal stretching members 61, 62 which are provided with narrow hosiery engaging outer edge portions. The stretching members 61, 62 are illustrated in the form of flat elongate plates which are pivotally interconnected at their upper ends as at 63. The lower end of the stretching member 61 is pivotally supported in a support block 64 which is fixed on the platform 60. A support block 65 is fixed on the other end of the platform 60 and a plate 66 connects the support blocks 64, 65. A slide rod 67 is fixed at opposite ends in the support blocks 64, 65 and its upper edge is provided with adjustment slots or grooves 68 (FIG. 10) for purposes to be presently described.

The stretching member 62 is pivotally supported at its lower end in a slide block 70 which is supported for sliding movement along the slide rod 67 and an adjustment and alignment handle 71 is fixed in the slide block 70 and extends forwardly therefrom. A spring pressed detent 72 is supported in the slide block 70 (FIG. 10) and is provided to maintain the slide block 70 in adjusted position when it engages one of the slots 68 in the slide rod 67.

A third longitudinal stretching member, illustrated in the form of a stretching wire 75, is connected at its upper end to the pivot 63 and at its lower end to the medial portion of a control handle 76. The control handle 76 is pivotally supported at its inner end on a slide block 77 which is supported for sliding movement on the slide rod 67. A tensioning rod 80 is supported in spaced relationship above the platform 60 by brackets 81, 82 and is provided with spaced-apart circular grooves 83 for indicating the proper position for placement of the stretching wire 75, in a manner to be presently described.

With the stretching members 61, 62 in a first closely spaced-apart position, as illustrated in FIGS. 6 and 8, the hosiery article is drawn over the stretching members and pins 83 may be positioned through the lower edges of the hosiery article and through suitable holes in the stretching members 61, 62 to maintain the lower edge of the hosiery article in the proper position. The operator then raises the detent 72 and moves the adjustment handle 71 and the slide block 70 outwardly or to the right until the handle 71 is aligned with the size of stocking being tested, that is, small, medium, large, or extra large. The detent 72 is then released so that it engages the proper slot 68 in the slide rod 67 to maintain the stretching members 61, 62 in a second spaced-apart position to uniformly stretch opposite halves of the hosiery article extending between the outer narrow hosiery engaging edge portions. In this condition, the hosiery article is uniformly stretched between the stretching member 61, 62 and chalk lines may then be formed down each narrow hosiery engaging edge of the stretching members 61, 62 to indicate equal halves of the uniformly stretched hosiery article.

The control handle 76 and block 77 are then moved along the slide rod 67 until the wire 75 is aligned with the groove 83 in the rod 80 which corresponds to the size of stocking on the stretching and marking device. The control handle 76 is then lowered to tension the wire 75, as illustrated in FIGS. 7 and 9, to uniformly stretch the outer half of the hosiery article outwardly and out of alignment with the stretching members 61, 62. Thus, the wire 75 equally divides and uniformly stretches the half of the hosiery extending between the narrow hosiery engaging edge portions of the pair of stretching members 61, 62 so that the stocking is in condition to be marked with a longitudinal chalk line extending along the wire 75 to indicate the equal division of adjacent quadrants of the hosiery article. Although the hosiery article has been described as being provided with three longitudinal lines, corresponding to each of the three stretching members (plates 61, 62 and wire 75), it is to be understood that chalk lines corresponding with the wire 75 and the narrow edges of either of the stretching members 61, 62 will provide an accurate division of the uniformly stretched hosiery article into one quadrant and the chalk lines can be used to properly align the hosiery article on the leg form. To remove the hosiery article from the stretching and marking device, the stretching member 62 and control handle 76 are moved back to the position shown in FIGS. 6 and 8 and the pins 83 are removed so that the stocking can be withdrawn over the upper ends of the stretching members 61, 62.

In operation, the hosiery article marked with quadrant chalk lines extending longitudinally is positioned on the leg form with the longitudinal chalk lines aligned with the vertical lines 53 and lights 52. A switch on the control unit 45 may be positioned in the off position so that air pressure is not introduced from the air supply source 30 while the hosiery article is being positioned on the form 11. When the hosiery article is properly positioned on the form 11, the outer sheets 15 of the flexible electro-pneumatic sensor devices 14 will each be moved inwardly to assume the radius of the leg form so that the electrical contacts 23, 24 will be in engagement with each other and in the closed position. The first set of lights 46 will then be lit to indicate to the operator that the electrical contacts 23, 24 of each of the electro-pneumatic sensor devices 14 is in the closed position.

The air supply switch is then moved to the on position so that air under pressure can pass through the open solenoid valves 36 and into the supply lines 20. Air pressure will then enter the expandable chambers of the electro-pneumatic sensor devices 14 and into pressure contact with the liquid in the liquid level tubes 40. When the air pressure builds up in the expandable chambers of each of the electro-pneumatic sensor devices 14 to the point that the electrical contacts 23, 24 are moved apart, the corresponding relay 50 will operate to close the corresponding solenoid valves 36. Then, no further air pressure will be introduced into the correspondng supply line 20 for the respective electro-pneumatic sensor device 14 and the level of liquid in the corresponding tube 40 will be maintained in the position attained when the electric contacts 23, 24 were moved to the open position. When the electrical contacts 23, 24 associated with a particular electro-pneumatic sensor device 14 open, the corresponding red light 46 will be turned off and the corresponding green light 47 will be turned on. When all of the green lights 47 are turned on, the operator can then read the pressure measurements from the liquid level tubes 40 and record the amount of compressive force applied by the hosiery article to the form 11 at each level where an electro-pneumatic sensor device 14 is located.

Since the leg portion 12 of the form 11 is circular in cross-section, the radius of the hosiery article and flexible sensor on the form is always constant at a particular elevation. Therefore, the compressive force applied by the hosiery article to the form at any longitudinal position does not vary from one area of the circle to another area, as would be the case when the hosiery article is positioned on a form having an non-circular cross-section with each respective sensor possessing like radii. The compressive force measurements provided by the present testing apparatus may be obtained in an efficient and accurate manner and the likelihood of obtaining distorted compressive force measurements is greatly reduced.

In the drawings and specification there have been set forth preferred embodiments of the invention, and although specific terms are employed, they are used in a generic and descriptive sense only and not for purposes of limitation, the scope of the invention being defined in the claims.

That which is claimed is:

1. An apparatus for accurately measuring and comparing the relative compressive forces of longitudinally spaced portions of stretchable hosiery articles, said apparatus comprising the combination of
   (a) a form including integral leg and foot portions and adapted to support a hosiery article in stretched condition thereon, said leg portion being circular in cross-section throughout its length with successive segments of the length of said leg portion increasing in circular diameter from said foot portion and throughout the length of said leg portion, and including
      (1) sensor devices supported on and in spaced positions longitudinally of said leg portion for determining the amount of pressure applied against said leg form in each of said positions by the hosiery article stretched thereon,
      (2) pressure indicating means operatively connected to each of said sensor devices and being operable to indicate the amount of pressure applied to each of said sensor devices by the hosiery article, and
      (3) hosiery positioning indicia lines extending longitudinally of and in spaced-apart relationship along said leg portion of said form, and
   (b) a hosiery article stretching and marking device for use in marking a hosiery article with longitudinally extending lines for indicating the proper placement of the hosiery article on said form in uniformly stretched condition, said marking device including
      (1) a pair of longitudinal stretching members provided with narrow hosiery engaging edge portions, said stretching members being initially positioned in a first spaced-apart position to receive the hosiery article in unstretched condition thereon, and
      (2) means for moving said longitudinal stretching members apart to a second spaced-apart position to uniformly stretch the areas of the hosiery article extending between said narrow hosiery engaging edge portions of said pair of stretching members and to support the stretched hosiery article thereon and in condition to be marked with longitudinal lines corresponding with said narrow hosiery engaging edge portions and indicating the equal halves of the stretched hosiery article,
      (3) a third longitudinal stretching member initially positioned in alignment between said pair of longitudinal stretching members when positioned in said first spaced-apart position, and
      (4) means for moving said third longitudinal stretching member to a position midway between and outwardly of alignment with said pair of longitudinal stretching members to equally divide and uniformly stretch the half of the hosiery article extending between said narrow hosiery engaging edge portions of said pair of stretching members and in condition to be marked with a longitudinal line corresponding with said third longitudinal stretching member and indicating the equal division of adjacent quadrants of the hosiery article, the longitudinal lines on the hosiery article providing guide lines for placing the hosiery article in the properly stretched condition with the marked lines on the hosiery article aligned with said indicia lines on the hosiery form.

2. An apparatus according to claim 1 wherein said sensor devices each comprise a flat flexible radii conformable electro-pneumatic sensor including an expandable chamber and a pair of electrical contacts within said expandable chamber, said electrical contacts being in a normally closed position and being movable to an open position when said expandable chamber is expanded.

3. An apparatus according to claim 2 wherein said pressure indicating means comprises fluid pressure means operatively connected to said electro-pneumatic sensors for at times expanding said expandable chambers, a control unit including signal lights operatively connected to each of said electro-pneumatic sensors for indicating the closed and open positions of said electrical contacts, and a manometer type liquid level pressure indicating gauge operatively connected to said fluid pressure means and to each of said electro-pneumatic sensors and being operable to indicate the amount of pressure applied to the corresponding expandable chamber to move said electrical contacts to the open position and to thereby indicate the amount of compressive force applied by the hosiery article against said form when said electrical contacts of the corresponding electro-pneumatic sensor is moved to the open position.

4. An apparatus according to claim 3 wherein said control unit signal lights include a first set of signal lights operatively connected to each of said electro-pneumatic sensors for indicating the closed position of said pair of electrical contacts, and a second set of signal lights operatively connected to each of said electro-pneumatic sensors for indicating the open position of said pair of electrical contacts.

5. An apparatus according to claim 3 including a plurality of spaced indicator lights aligned longitudinally of said leg portion for aiding in aligning the hosiery article in the proper quadrant and elevational position on said leg portion for testing.

6. An apparatus according to claim 3 including a plurality of spaced indicator lines extending around the circumference of said leg portion and in spaced-apart relationship to aid in the proper elevational positioning of the hosiery article on said leg portion for testing.

7. An apparatus according to claim 6 including a plurality of spaced indicator lights aligned longitudinally of said leg portion for aiding in aligning the hosiery article, wherein one of said indicator lines extends around said leg portion at the level of each of said indicator lights.

8. An apparatus according to claim 5 including an indicator line extending longitudinally along said leg portion and between said plurality of spaced indicator lights.

9. An apparatus according to claim 1 wherein said longitudinal stretching members of said stretching and marking device comprise a pair of flat elongate plates pivotally interconnected at one end, and including means for moving and maintaining the other ends of said flat elongate plates spread apart a predetermined distance, depending upon the size of hosiery article to be marked.

10. An apparatus according to claim 9 wherein said third longitudinal stretching member comprises a stretching wire fixed at one end to the pivotal interconnection of said pair of flat elongate plates and including means for positioning the other end of said stretching wire midway between said flat elongate plates, and means for tensioning said wire to equally divide and uniformly stretch the half of the hosiery article extending between said flat elongate plates and form adjacent uniformly stretched quadrants of the hosiery article.

* * * * *